US012589357B2

(12) United States Patent
Atkins et al.

(10) Patent No.: US 12,589,357 B2
(45) Date of Patent: Mar. 31, 2026

(54) PROCESS FOR PRODUCING A CARBON PRODUCT AND CARBON FIBERS THROUGH A CARBON NEUTRAL OR CARBON NEGATIVE PROCESS

(71) Applicant: Carbon Utility LLC, Tucson, AZ (US)

(72) Inventors: Stephen Atkins, Sun City, AZ (US); Stephen D. Miller, Flagstaff, AZ (US)

( * ) Notice: Subject to any disclaimer, the term of this patent is extended or adjusted under 35 U.S.C. 154(b) by 0 days.

(21) Appl. No.: 19/216,398

(22) Filed: May 22, 2025

(65) Prior Publication Data

US 2025/0281878 A1 Sep. 11, 2025

Related U.S. Application Data

(63) Continuation-in-part of application No. PCT/US2024/053762, filed on Oct. 30, 2024, which
(Continued)

(51) Int. Cl.
| | |
|---|---|
| *B01D 53/96* | (2006.01) |
| *B01D 53/62* | (2006.01) |
| *B01D 53/75* | (2006.01) |
| *B01D 53/78* | (2006.01) |
| *C25B 1/04* | (2021.01) |
| *C25B 1/16* | (2006.01) |
| *C25B 9/21* | (2021.01) |
| *C25B 15/08* | (2006.01) |

(52) U.S. Cl.
CPC ........... *B01D 53/965* (2013.01); *B01D 53/62* (2013.01); *B01D 53/75* (2013.01); *B01D 53/78* (2013.01); *C25B 1/04* (2013.01); *C25B 1/16* (2013.01); *C25B 9/21* (2021.01); *C25B 15/081* (2021.01); *C25B 15/087* (2021.01);

*B01D 2251/304* (2013.01); *B01D 2251/306* (2013.01); *B01D 2251/604* (2013.01); *B01D 2257/504* (2013.01)

(58) Field of Classification Search
CPC ....... C01B 3/025; C01B 32/60; B01D 53/965; B01D 53/62; B01D 53/75; B01D 53/78; B01D 2251/304; B01D 2251/306; B01D 2251/604; B01D 2257/504; B01D 2258/06; C25B 1/04; C25B 1/16; C25B 9/21; C25B 15/081; C25B 15/087; C25B 15/08; C01D 7/07; Y02P 20/151; Y02C 20/40

See application file for complete search history.

(56) References Cited

U.S. PATENT DOCUMENTS

| | | |
|---|---|---|
| 5,246,551 A | 9/1993 | Pletcher et al. |
| 6,419,814 B1 | 7/2002 | Pletcher et al. |
| | (Continued) | |

FOREIGN PATENT DOCUMENTS

| | | | | |
|---|---|---|---|---|
| CN | 101270198 B | * | 6/2011 | |
| CN | 109400780 A | * | 3/2019 | ............... C08F 2/38 |
| | (Continued) | | | |

*Primary Examiner* — Ciel P Contreras

(74) *Attorney, Agent, or Firm* — Invention To Patent Services; Alex Hobson

(57) ABSTRACT

A process for producing a carbon nano-fiber includes utilizing methanol and ammonia that are combined to produce acetonitrile. The acetonitrile and methanol are synthesized to produce acrylonitrile. The acrylonitrile is polymerized into polyacrylonitrile which is then electro-spun and carbonized to form carbon fibers.

21 Claims, 7 Drawing Sheets

Related U.S. Application Data is a continuation of application No. 18/584,503, filed on Feb. 22, 2024, now Pat. No. 12,151,206.

(60) Provisional application No. 63/659,812, filed on Jun. 13, 2024, provisional application No. 63/650,881, filed on May 22, 2024, provisional application No. 63/594,523, filed on Oct. 31, 2023.

(56) References Cited

U.S. PATENT DOCUMENTS

| | | | |
|---|---|---|---|
| 9,085,497 B2 | 7/2015 | Jennings | |
| 9,133,072 B1 | 9/2015 | Strong et al. | |
| 2022/0118406 A1* | 4/2022 | Lackner | C25B 1/04 |
| 2022/0388855 A1* | 12/2022 | Dincer | C01B 3/042 |

FOREIGN PATENT DOCUMENTS

| | | | | |
|---|---|---|---|---|
| JP | S60190750 A | * | 9/1985 | |
| WO | WO-2022117421 A1 | * | 6/2022 | B01J 23/835 |

* cited by examiner

PROCESS FOR PRODUCING A CARBON PRODUCT AND CARBON FIBERS THROUGH A CARBON NEUTRAL OR CARBON NEGATIVE PROCESS

CROSS REFERENCE TO RELATED APPLICATIONS

This application is a continuation in part of international patent application No. PCT/US2024/053762, having an international filing date of Oct. 30, 2024, which claims the benefit of priority to U.S. patent application Ser. No. 18/584,503 filed on Feb. 22, 2024 and issued as U.S. Pat. No. 12,151,206, and claims the benefit of priority to U.S. provisional patent application No. 63/594,523, filed on Oct. 31, 2023, and to U.S. provisional patent application No. 63/659,812, filed on Jun. 13, 2024, and this application claims the benefit of priority to U.S. provisional patent application No. 63/650,881, filed on May 22, 2024; the entirety of each priority application is hereby incorporated by reference herein.

BACKGROUND OF THE INVENTION

Field of the Invention

The invention relates to a process for producing carbon and carbon fibers through a sustainable process that is preferably a carbon negative process wherein the process permanently sequesters carbon dioxide from the environment.

Background

Climate change is the defining crisis of our time. In common terms, climate change describes global warming, the ongoing increase in global average temperatures. Climate change threatens mankind with extreme heat, increased food and water scarcity, ocean acidification, sea level rise and species extinction, including, possibly our own.

In order to limit the damaging effects of climate change, the Intergovernmental Panel on Climate Change (IPPC) has set goals and modeled pathways to limit global warming to 1.5 or 2.0° C. Included in these pathways is the deployment of the "unavoidable" requirement that carbon dioxide be removed from the atmosphere and sequestered for hundreds or thousands of years.

Sequestration can take the form of long-term storage in deep geological formations, such as exhausted oil and gas fields or saline aquafers. But such sequestration is expensive and offers little or no economic value as the sequestered CO2 can not be utilized.

Another form of sequestration is mineral sequestration, where captured CO2 is transformed into solid carbonates, including calcium carbonate (CaCO3). Each tonne of calcium carbonate can sequester 0.44 tonnes of carbon dioxide.

Solid carbonates are used in an array of industries including construction, cement manufacturing, paper and pulp, pharmaceuticals, agriculture, and refractory metals. However, many of these applications result in the release of CO2 and so are not suitable for sequestration. One of the largest markets for solid carbonates suitable for sequestration is crushed stone construction aggregates, which is typically mined from calcium carbonate or dolomite deposits. Crushed stone aggregate is readily available at $12/tonne according to the USGS Mineral Commodity Summaries, 2019.

While there is a market for calcium carbonate at $12/tonne, calcium carbonate synthesized from captured CO2, cannot compete economically with mined carbonates: Sequestering 1 tonne of CO2 would require the formation of 2.3 tonnes of calcium carbonate, which has a current market value of about $27; just capturing 1 tonne of CO2 costs anywhere between an optimistic and so far, unrealized $200/tonne to an actual $600/tonne. Thus, calcium carbonate formed from captured CO2 is at least 10 times as expensive as mined carbonates and is not commercially viable.

What is needed is a commercially viable, CO2-sequestering product that can be derived from CO2 captured from the atmosphere. An example of a carbon product is carbon fibers.

Carbon fibers are essentially carbon graphite, which is not photo-degradable or biodegradable. Hence, if the carbon and other precursors used to make carbon fibers can be pulled from the atmosphere in a carbon-free manner, that is using renewable energy, then the production of carbon fibers could be considered carbon negative. The chemical precursor to carbon fibers (CF) is acrylonitrile, which is polymerized to polyacrylonitrile, electro-spun into acrylic fibers, and then carbonized into carbon fibers.

Currently, about 90% of acrylonitrile production is by way of the SOHIO process, developed in the 1950's by Standard Oil of Ohio, which uses propylene from crude oil, ammonia, derived from natural gas, and air, as inputs. Apart from the environmental damage caused by the extraction and utilization of crude oil, oil markets have been subject to price volatility, shortages, and foreign manipulation. And, as recent events have shown, natural gas is also subject to price volatility, shortages, and foreign manipulation. This has caused ammonia to triple in price internationally. Since 70% of ammonia is used as fertilizer and accounts for about 40% of all food calories, fossil-based production of carbon fibers from ammonia quite literally competes with food production.

In addition to the potential for carbon fibers to be a carbon negative sink, the utilization of carbon fiber typically displaces fossil-based materials such as steel and aluminum. Obvious examples include the use of carbon fiber car bodies that eliminate steel, aluminum, and other more exotic alloys, while simultaneously reducing the weight of the vehicle. Another example is the use of carbon fibers to strengthen cement, which can reduce or eliminate steel rebar.

SUMMARY OF THE INVENTION

It is the object of this invention to provide a process for producing carbon and carbon fibers through a sustainable process that is preferably a carbon negative process wherein the process permanently sequesters carbon dioxide from the environment. The process may utilize renewable energy sources for performing steps of the process without emitting carbon dioxide, such as through the use of combusting fossil fuels. Also, the process may utilize components or reactants that are green, or produced without emitting carbon dioxide. The carbon dioxide may be green carbon dioxide, such as air captured carbon dioxide and/or from a point source or waste source process. Likewise, the hydrogen may be green or blue hydrogen, coined as "teal hydrogen" as used herein. Also, the methanol may be produced from the green carbon dioxide and said teal hydrogen and utilize a renewable power source to produce a green methanol, made without emission of carbon dioxide. Nitrogen may be derived from the atmosphere through a separation process, again using a renewable power supply to produce a green nitrogen. Ammonia may be produced from the green nitrogen and green hydrogen to produce a green ammonia, utilizing a renewable power source. The green methanol and green ammonia may be combined to form precursor acetonitrile and product acetonitrile may be synthesized from this precursor acetonitrile and methanol or green methanol. Then the product acrylonitrile may be polymerized to polyacrylonitrile and subsequently formed into fibers, such as by electrospinning to form acrylic fibers and subsequently carbonized to form carbon fibers. These carbon fibers may be micro-carbon fibers having a diameter of no more than 1 mm or nano-carbon fibers having a diameter of no more than 1 micron. Micro-carbon fibers may have a diameter of about 10 μm or less, or from about 500 nm to about 10 μm, or from about 1 μm to about 10 μm. A nano-carbon fiber may have a diameter of about 1 μm or less, such as from about 200 nm or 500 nm to about 1 μm or from about 200 nm to about 500 nm.

In general, to be considered carbon negative, the carbon used to manufacture carbon product such as carbon fibers needs to be extracted from the atmosphere in the form of CO2 gas and any energy needed to power the processes of manufacture should come from carbon-free power sources such as solar, wind, hydro, nuclear, and the like. In addition, "sequestration" implies that the resulting carbon fibers must be stable for hundreds of years, that is the carbon fibers must not degrade or release its carbon back into the atmosphere in the form of CO2 or other greenhouse gases.

An exemplary process to manufacture non-degradable carbon such as carbon fibers may utilize carbon-free inputs of CO2, hydrogen, and nitrogen, which may be derived from just three inputs, air, water, and renewable electricity. If this process is powered by a carbon-free power source, such as nuclear power, then the manufactured nondegradable carbon fibers will be carbon negative. Other renewable power sources which are considered carbon-free power sources include solar power, wind power and hydropower.

Renewable electricity, as used herein, includes but is not limited to, solar power, wind power, hydroelectric power and power from fuel-cells.

CO₂ Capture

The direct air capture of carbon dioxide removes carbon dioxide from an air inlet flow in both the hydroxide-based carbon dioxide capture system and the carbonate-based carbon dioxide capture system while the electrolytic-based three-compartment electrolytic cell releases separate gaseous streams of carbon dioxide, hydrogen, and oxygen.

The hydroxide-based carbon dioxide capture system may utilize a fan to pass air over a high surface area packing material that allows an initial aliquot of hydroxide to be dispensed into or onto the packing material. The hydroxide solution may be carried by overhead piping and coated, such as by spraying onto and throughout the surfaces of the packing material while air simultaneously flows over and through the packing material to enable the reaction as shown in Reaction 1 to remove carbon dioxide from air.

The packing material may be plastic in the form of either polypropylene (PP) or Polyvinyl Chloride (PVC) and is porous and permeable to allow air to pass therethrough. The packing material may be corrugated or pleated to provide a high surface area to maximize gas liquid interface for chemical reactions to occur thereon. Packing material may be the same or similar material that is commercially available and is typically used in water cooling towers. The hydroxide-based carbon dioxide capture system may be configured inside of a boxed container, a hydroxide container, having two walls, a floor, a ceiling and two open ends to allow ambient air to be directed to flow from an open inlet end, over and through the packing material, and then out through the open outlet end. The inlet and outlet may have openings to allow the respective inlet airflow and outlet airflow to flow therethrough and to prevent dirt, debris, and animals from entering the container. The hydroxide-container may be a shipping container, such as a truck trailer having a longitudinal dimension of about 6.1 m (20 ft) or more, about 9.14 m (30 ft) or more, or about 12.19 m (40 ft) or more in length and a width and height of about 2.4 m (8 ft) or more, about 3.05 m (10 ft) or more, about 4.57 m (15 ft) or more any range between and including the values provided. An exemplary shipping container is standardized (by the International Organization for Standards (ISO)) metal container, millions of which are designed and built each year for international intermodal freight transport. ISO shipping containers are international intermodal containers that meet the standards specified by the International Organization for Standardization (ISO). Standardized shipping containers have features suitable for the system described herein, including having doors at both ends to allow our airflow requirements, they are stackable, abundant, cheap, and commercially transportable by truck, train, or ship.

An air moving device may be used to force air through the hydroxide container of the hydroxide-based carbon dioxide capture system. Also, a demisting device may be used to remove any hydroxide compound, hydroxide solution, carbonate compound or carbonate solution from the airflow before it passes out as outlet airflow. An exemplary demisting device is a permeable material, such as a filter configured to capture particles and droplets. A demisting device may become saturated and drip captures compounds into a collection tank.

The water-based solution of sodium hydroxide or potassium hydroxide (NaOH or KOH) may be spread over the packing material by spraying, dipping, or allowing the hydroxide to wick into or onto the packing material. The carbon dioxide is extracted from the air as it contacts the hydroxide solution forming a sodium or potassium carbonate ($Na_2CO_3$ or $K_2CO_3$) solution:

$$CO_2 + 2NaOH \rightarrow Na_2CO_3 + H_2O \qquad \text{Reaction 1:}$$

This newly formed carbonate solution moves out of the packing material and is collected in a collector which may be a carbonate tank on the floor of the hydroxide container. The carbonate solution may fall from the packing material due to gravity into the carbonate tank. System parameters including air velocity and flow rate, hydroxide molarity, and solution flow rates are adjusted to maximize hydroxide to carbonate conversion in one pass though the packing material.

The carbonate solution is pumped from the carbonate tank and into the carbonate-based carbon dioxide capture system, where it is spread over a packing material in the carbonate container by spraying, dipping or allowing the carbonate to wick into or onto the packing material while air simultaneously flows over and through the packing material to enable the reaction provided in Reaction B, wherein carbon dioxide and carbonate are converted to bicarbonate. Thus, additional carbon dioxide is advantageously extracted from the air as it contacts the carbonate solution forming a sodium or potassium bicarbonate ($NaHCO_3$ or $KHCO_3$) solution.

$$Na_2CO_3 + H_2O + CO_2 \rightarrow 2NaHCO_3 \qquad \text{Reaction 2:}$$

Like the hydroxide-based carbon dioxide capture system, the carbonate-based carbon dioxide capture system may be configured inside of a boxed container, such as a shipping container or a truck trailer, a carbonate container, having two walls, a floor, a ceiling and two open ends to allow ambient air to flow from an open inlet end, through the packing material, and then out through the open outlet end. An air-moving device, such as a fan may be utilized to move the ambient air into, through and out of the carbonate container. The carbonate container may be a shipping container or truck trailer having a longitudinal dimension of about 6.1 m (20 ft) or more, about 9.14 m (30 ft) or more, or about 12.19 m (40 ft) or more in length and a width and height of about 2.4 m (8 ft) or more, about 3.05 m (10 ft) or more or about 4.57 m (15 ft) or more. The inlet and outlet may have openings to allow the respective inlet airflow and outlet airflow to flow therethrough and to prevent dirt, debris, and animals from entering the container.

Also, a demisting device may be used to remove any carbonate compound, carbonate solution, bicarbonate compound or bicarbonate solution from the airflow before it passes out as outlet airflow from the carbonate container. An exemplary demisting device is a permeable material, such as a filter configure to capture particles and droplets. A demisting device may become saturated and drip captures compounds into a collection tank.

The two containers, the hydroxide and carbonate containers may be stacked, one atop the other for efficiency and to reduce floor space required for the system.

CO2 Release:

In the three-compartment electrolytic cell, pure carbon dioxide and hydrogen gas are released by electrolysis. The carbon dioxide isolation process may be configured in a third and separate electrolytic cell container from the other two containers of the hydroxide-based and carbonate-based capture systems and may also be a shipping container. Furthermore, the electrolytic cell container may be a shipping container, such as a truck trailer, having a large dimension of about 6.1 m (20 ft) or more, about 9.14 m (30 ft) or more, or about 12.19 m (40 ft) or more in length and a width and height of about 2.4 m (8 ft) or more, about 3.05 m (10 ft) or more, about 4.57 m (15 ft) or more and any range between and including the values provided. The carbon dioxide rich sodium bicarbonate solution formed by the hydroxide-based and carbonate-based carbon dioxide capture systems flows into a novel three-compartment electrolytic cell that extracts and isolates pure carbon dioxide, hydrogen, and oxygen from the sodium bicarbonate solution; in the process converting the bicarbonate solution back into sodium hydroxide, which is recirculated by means of a pump, back to the hydroxide-based $CO_2$ capture system. The carbon dioxide and hydrogen are available for immediate on-site use (e.g., greenhouse, sequestration, fuel synthesis, etc.) or they can each be compressed and stored or sold. The electrolytic cell also produces oxygen, which is typically vented but may also be utilized or otherwise monetized.

All three of the containers, the hydroxide and carbonate containers as well as the electrolytic cell container may be stacked, one atop the other for efficiency and to reduce floor space required for the system.

The two primary chemical processes taking place in the 3-compartment electrolytic cell are described by the reactions below:

$$NaHCO_3 \rightarrow NaOH + CO_2 \qquad \text{Reaction 3:}$$

$$H_2O \rightarrow H_2 + \tfrac{1}{2}O_2 \qquad \text{Reaction 4:}$$

The three-compartment electrolytic cell includes an anode compartment, a cathode compartment and a middle compartment arranged between the anode and cathode compartments and separated therefrom by two semi-permeable membranes. Each compartment has an inlet and an outlet for the conveyance of electrolyte solutions. The anode compartment contains a metal anode electrode electrically connected to the positive side of a direct current power supply. The cathode compartment contains a metal cathode electrode electrically connected to the negative side of a direct current power supply. The electrolytic cell may contain multiple 3-compartment slices or frames that are horizontally "stacked" together, the number of which determine the capacity of the electrolytic cell to process bicarbonate and release carbon dioxide, hydrogen, and oxygen gases. At the maximum capacity of about twelve frames (operating at 3000 amps/m^2), the cell measures about 1 m (3 ft) in height, width, and depth, and can release 1000 kg (2200 lbs) of carbon dioxide and 45 kg (100 lbs) of hydrogen per day. A single electrolytic cell may be used in the three-compartment electrolytic cell.

The direct air capture of carbon dioxide system may be configured in three containers, wherein the hydroxide-based carbon dioxide capture system is configured in a first container, the carbonate-based carbon dioxide capture system is configured in a second container and the three-compartment electrolytic cell is configured in a third container. The first and second containers may be elongated having a length from a first end to a second end that is at least twice the width of the compartment. The airflow may flow through the first and second containers from the first end to the second end and an air moving device such as a fan may direct airflow through the respective container. The first container or hydroxide container may be stacked on top of the second container, the carbonate container, to reduce area required for the system.

An exemplary direct air capture of carbon dioxide system may utilize a single container for both the hydroxide-based carbon dioxide capture system and the carbonate-based carbon dioxide capture system by incorporating a recycle loop, wherein carbonate formed by the hydroxide conversion on the packing material is collected and redirected to back to the same packing material to produce bicarbonate. A series of valves may be used to control the change from a flow of hydroxide solution to carbonate solution onto the packing material. A pump may recirculate the carbonate solution from the collection tank that receives the carbonate solution from the packing material back onto the packing material where the carbonate solution is used as a solvent to capture additional CO2, which converts the carbonate solution into bicarbonate solution as detailed in Reaction 2. The recirculation of carbonate solution from the collection tank to the packing material continues until substantially all of the carbonate has been converted into bicarbonate.

An exemplary process to manufacture carbon-negative carbon fibers, includes the following steps. The first step, and key to creating carbon-negative carbon fibers, is the ability to capture carbon in the form of CO2 from the atmosphere. This step may employ a cyclic process that utilizes a liquid hydroxide solution as a solvent to capture CO2, which forms a carbonate solution; the hydroxide may be any metal salt such as potassium or sodium hydroxide. An exemplary reaction is:

$$CO_2 + 2NaOH \rightarrow Na_2CO_3 + H_2O \qquad \text{Reaction 1:}$$

Pure CO2 gas is liberated from the carbonate solution by an electrolytic cell that regenerates the original hydroxide solution and simultaneously delivers separate streams of pure hydrogen and oxygen gases through water electrolysis. The relevant reactions are:

$$Na_2CO_3 + H_2O \rightarrow CO_2 + 2NaOH \qquad \text{Reaction 5:}$$

$$H_2O \rightarrow H_2 + \tfrac{1}{2}O_2 \qquad \text{Reaction 4:}$$

The second step along that path is to synthesize carbon-free methanol (CH3OH) from just CO2 and hydrogen:

$$CO2 + 3H2 \rightarrow CH3OH + H2O \text{ (at 260° C. and 100 bar)} \qquad \text{Reaction 6:}$$

This process, which does not require syngas is described in U.S. Pat. No. 12,151,206, issued on Nov. 26, 2024 to Carbon Utility LLC; the entirety of which is hereby incorporated by reference herein. The third step is the synthesis of green ammonia (NH3) from hydrogen and nitrogen:

$$3H2 + N2 \rightarrow 2NH3 \qquad \text{Reaction 7:}$$

This reaction occurs at about 300° C. and 30 to 80 bar and may use KATALCO 74-1 green catalyst. The nitrogen can be sourced from the atmosphere, using commercially available nitrogen gas generators, and should be powered by renewable electricity.

The fourth step is to combine methanol and ammonia to form acetonitrile (C2H3N):

$$2CH3OH + NH3 \rightarrow C2H3N + 2H2O + 2H2 \qquad \text{Reaction 8:}$$

This reaction occurs at about 500° C. and 2 bar and may use a molybdenum/silica catalyst.

The fifth step is to synthesize acrylonitrile (C3H3N) from acetonitrile and methanol:

$$C2H3N + CH3OH \rightarrow C3H3N + H2O + H2 \qquad \text{Reaction 9:}$$

This reaction occurs at about 350° C. and 0.5 bar and may use a chromium-magnesium oxide catalyst.

In the sixth step, acrylonitrile is polymerized to polyacrylonitrile (C2H3N)n $$C2H3N \rightarrow (C2H3N)n \qquad \text{Reaction 10:}$$

This reaction is facilitated by using an initiating system consisting of hydrogen peroxide (H2O2) and Ferric Chloride (FeCl3).

Once the polyacrylonitrile is synthesized, it will be electrospun into acrylic fibers by a commercially available electrospinning machine, using techniques known to those skilled in the art. The acrylic fibers will then be stabilized and carbonized into carbon fiber using an atmospherically-controlled, programmable furnace.

DEFINITIONS

Green hydrogen is hydrogen produced through the electrolysis of water using a carbon-free power source such as using renewable electricity, making it a clean energy source with significantly lower greenhouse gas emissions compared to traditional hydrogen production methods, such as grey hydrogen derived from fossil fuels.

Blue hydrogen is a term used for decarbonized hydrogen produced by natural gas reforming coupled with carbon capture and storage (CCS). While the process generates hydrogen, it also produces carbon dioxide as a by-product, which is then captured and stored. Blue hydrogen is sometimes referred to as 'low-carbon hydrogen' because it doesn't completely avoid greenhouse gas creation during the steam reforming process. It starts with converting methane to hydrogen and carbon dioxide, similar to gray hydrogen, but goes further by capturing some of the carbon dioxides.

As used herein, teal hydrogen includes both green or blue hydrogen.

Polyacrylonitrile (PAN) is a derivative of acrylic acid where the carboxylic acid group is replaced by the related nitrile group. It is a semi-crystalline polymer and is used in clothing, home furnishings, and as a precursor for carbon fiber.

Carbon-free power source includes power sources that do not emit carbon dioxide or other greenhouse gases to the atmosphere and include, but are not limited, to nuclear power, renewable power sources including, but are not limited to, solar, wind, hydro, hydrodynamic and geothermal.

A green component as used herein, such as green hydrogen, green nitrogen, green methanol and green ammonia are made through green processing that utilizes a carbon-free power source, such as those that do not emit carbon dioxide from the burning of fossil fuels.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Corresponding reference characters indicate corresponding parts throughout the several views of the figures. The figures represent an illustration of some of the embodiments of the present invention and are not to be construed as limiting the scope of the invention in any manner. Some of the figures may not show all of the features and components of the invention for ease of illustration, but it is to be understood that where possible, features and components from one figure may be included in the other figures. Further, the figures are not necessarily to scale, some features may be exaggerated to show details of particular components. Therefore, specific structural and functional details disclosed herein are not to be interpreted as limiting, but merely as a representative basis for teaching one skilled in the art to employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations, and improvements of the described embodiments, will occur to those skilled in the art and all such alternate embodiments, combinations, modifications, improvements are within the scope of the present invention.

Figure 1:
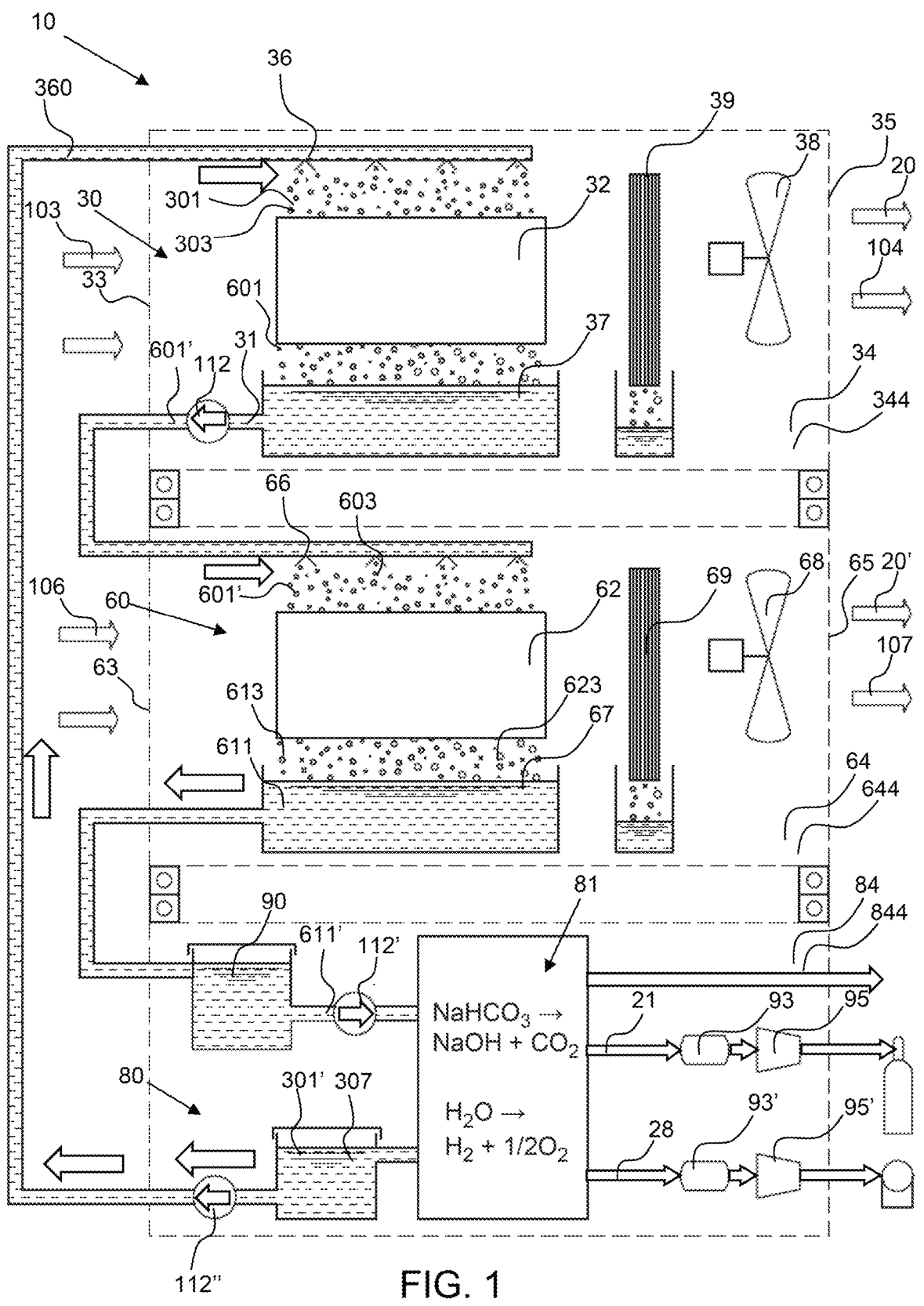
FIG. 1 shows a diagram of an exemplary direct air capture of carbon dioxide system that utilizes a 3-compartment electrolytic cell, a hydroxide-based carbon dioxide capture system and a carbonate-based carbon dioxide capture system.

The hydrogen and/or nitrogen and/or ammonia or methanol may be produced by a direct air capture of carbon dioxide apparatus and process as described in U.S. Pat. No. 12,151,206, issued on Nov. 26, 2024, to Carbon Utility LLC; the entirety of which is hereby incorporated by reference herein. FIG. 1 of the present application is shown in U.S. Pat. No. 12,151,206.

As shown in FIG. 1, the exemplary direct air capture of carbon dioxide ($CO_2$) system 10, utilizes a hydroxide-based carbon dioxide capture system 30, connected to a carbonate-based carbon dioxide capture system 60, which is connected to an electrolytic cell system 80. The hydroxide-based carbon dioxide capture system 30 produces a carbonate compound 603, such as a carbonate solution 601 from a hydroxide compound 303, such as a hydroxide solution 301 that is coated onto packing material 32. The carbonate-based carbon dioxide capture system 60 produces a bicarbonate compound 613, such as a bicarbonate solution 611 from the carbonate solution 601' that is coated onto the packing material 62. The electrolytic cell system 80 receives the bicarbonate solution 611', which enters the three-compartment electrolytic cell 81 and is converted to hydroxide solution 301', carbon dioxide 28, hydrogen 21, and oxygen. The hydroxide solution 301' is pumped by pump 112" from a hydroxide tank 307, coupled with the three-compartment electrolytic cell 81, back to the hydroxide-based carbon dioxide capture system 30 through a recycle conduit 360, while the gases may be compressed and stored.

The hydroxide-based carbon dioxide capture system 30 utilizes a packing material 32 that has a hydroxide solution 301, such as a sodium hydroxide solution or a potassium hydroxide solution dispensed, such as via hydroxide solution spray nozzles 36, onto and through the packing material. The inlet airflow 103 is forced through the hydroxide container 34 from an inlet 33 to an outlet 35 by an air moving device 38 and exits the outlet as outlet airflow 104 that contains carbon dioxide depleted air 20. Carbonate solution 601 is collected in a carbonate tank 37 and transferred to the carbonate-based carbon dioxide capture system 60 by a pump 112. The carbonate solution contains carbonate 31. It will be apparent to those skilled in the art that the carbonate solution may contain traces of hydroxide solution. The hydroxide-based carbon dioxide capture system 30 may include de-misting devices 39 to reduce the hydroxide in the airflow from exiting the hydroxide container 34. The hydroxide container may be a truck trailer 344 as described herein having a length of about 6.1 m (20 ft) or more, a width of 2.4 m (8 ft) or more, and a height of 2.4 m (8 ft) or more The carbonate-based carbon dioxide capture system 60 utilizes a packing material 62 that has carbonate solution 601', such as a sodium carbonate solution or potassium carbonate solution, dispensed, such as by sodium carbonate solution spray nozzles 66, onto and therethrough the packing material 62.

Inlet airflow 106 is forced through the carbonate-based carbon dioxide capture container 64 from an inlet 63 to an outlet 65 by an air moving device 68 and exits the outlet as outlet airflow 107 that contains carbon dioxide depleted air 20'. Bicarbonate 611 is collected in the bicarbonate tank 67 and transferred to the electrolytic cell system 80 by pump 112'. It will be apparent to those skilled in the art that the bicarbonate solution may contain traces of carbonate solution and hydroxide solution. The carbonate-based carbon dioxide capture system 60 may include de-misting devices 69 to reduce the carbonate in the airflow from exiting the carbonate container 64. The carbonate container 64 may be a truck trailer 644 as described herein.

The electrolytic cell system 80 receives bicarbonate solution 611' from the carbonate-based carbon dioxide capture system 60 and includes a three-compartment electrolytic cell 81 to electrochemically convert the bicarbonate solution 611' into hydroxide solution 301', and separate gaseous streams of carbon dioxide 28, hydrogen 21, and oxygen 22. The electrolytic cell system 80 may include a source of make-up water (not shown) for continuous, long-term operation and may employ a bicarbonate holding tank 90, gas buffer tanks 93, 93' and compressors 95, 95' to compress the hydrogen and carbon dioxide products from the electrolytic cell system 80, respectively. The electrolytic cell system may be configured in an electrolytic cell container 84, such as an ISO shipping container or truck trailer 844 as described herein.

The air moving devices 38 and 68 may be configured on swing arms to allow easy access to the respective containers for maintenance. The de misting panels may allow less than 0.0005% of hydroxide or carbonate solutions to exit the container.

A portion of said carbonate compound from said hydroxide-based carbon dioxide capture system may pass through the carbonate-based carbon dioxide capture system as a non-converted carbonate compound 623 and a recycle pump may be configured to return said non-converted carbonate to said carbonate-based carbon dioxide capture system.

Figure 2:
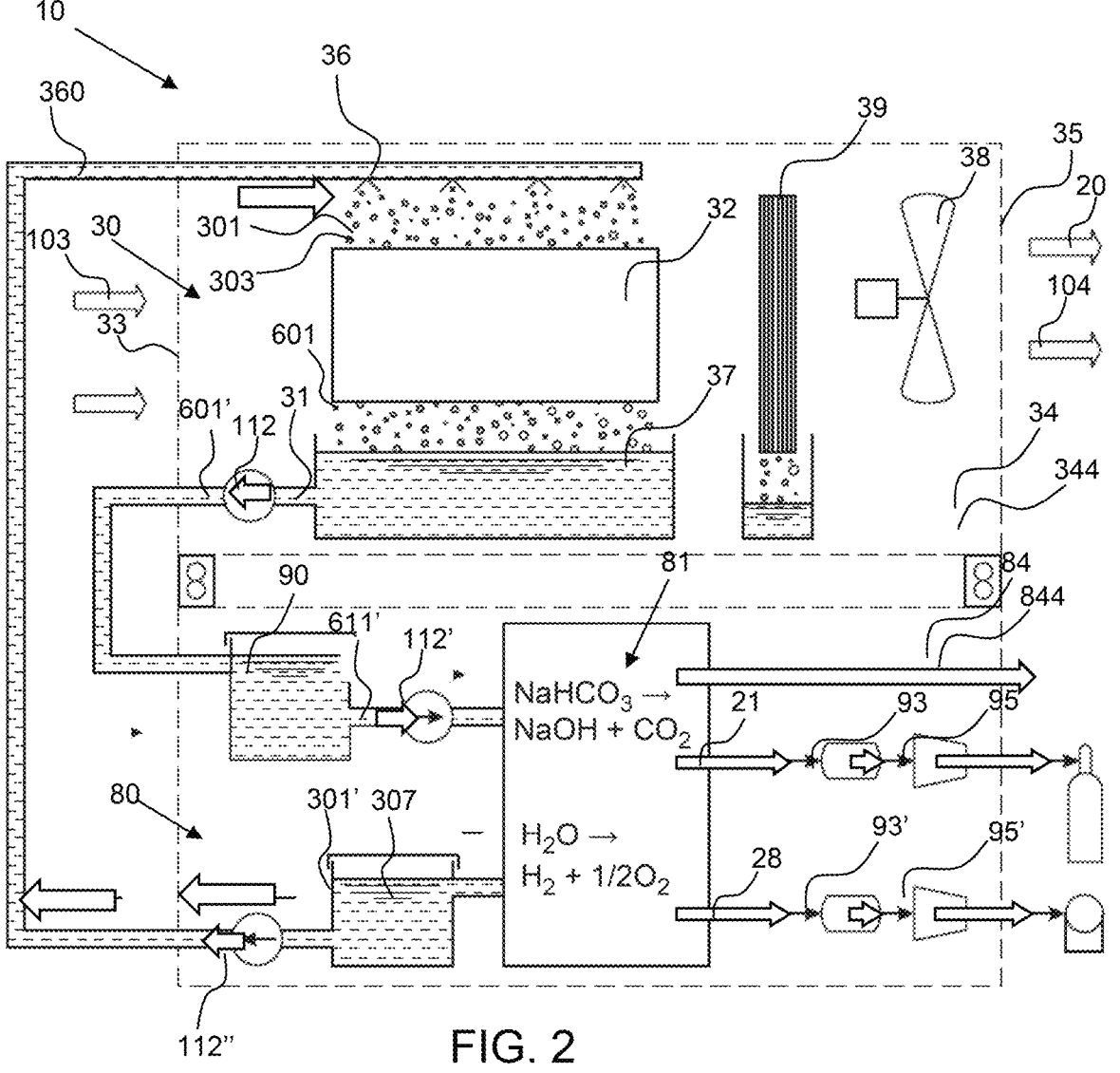
FIG. 2 shows a diagram of an exemplary first step of the process where CO2 is captured from the air using an hydroxide solution, which forms a carbonate solution and a novel electrolytic cell, which releases separate streams of pure CO2, hydrogen and oxygen from the carbonate solution and in the process, converts the carbonate solution back to a hydroxide solution for reuse/recirculation to capture more CO2 from the air.

As shown in FIG. 2, the green CO2 air capture process uses a hydroxide solution to capture CO2 from the air as shown and described for FIG. 1 but does not include the carbonate-based carbon dioxide capture system 60. In this simpler process, the hydroxide solution converts the hydroxide to a carbonate solution. This is followed by an electrolytic-based process that releases CO2, hydrogen, and oxygen from the carbonate solution, and in so doing, transforms the carbonate back into hydroxide for reuse.

CO2 Capture: In this step, CO2 is captured from the air. The CO2 capture unit is contained in a 40-ft shipping container that is mostly filled with a self-supported, cross-flow plastic packing material of high surface area to volume. An industrial fan, which may be mounted on a swing-away carrier for maintenance access, moves ambient air through the container that is open at both ends. Within the shipping container, a water-based solution of sodium hydroxide (NaOH) pumped through overhead PVC pipe, is spread over the packing material, fully wetting it from top to bottom, while air is blown horizontally through the wetted packing by the fan. Demisting panels allow less than 0.0005% of hydroxide or carbonate solutions to exit the container. The panels may be mounted in a bi-fold door configuration for maintenance access. CO2 is extracted from the air as it contacts the hydroxide solution forming a sodium carbonate (Na2CO3) solution:

$$CO2+2NaOH \rightarrow Na2CO3+H2O$$

This newly formed carbonate solution falls out of the porous packing material and is collected in the carbonate tank on the floor of the shipping container. System parameters including air velocity and flow rate, hydroxide molarity, and solution flow rates are adjusted to optimize CO2 capture and maximize hydroxide to carbonate conversion in one pass though the packing material.

CO2 Release: In this subprocess, sodium carbonate, formed in the CO2 capture container, flows into a novel 3-compartment electrolyzer that is housed in a second (bottom) 40-ft shipping container. The electrolyzer initiates two chemical processes—one that converts the carbonate solution back into hydroxide thereby releasing CO2, and a second, water splitting process, that releases hydrogen and oxygen. The hydroxide solution is pumped back into the CO2 capture unit while the CO2 and hydrogen are compressed and made available for immediate conversion to methanol and ammonia. The two primary chemical equations governing the 3-compartment electrolyzer are described below:

$$Na2CO3+H2O \rightarrow 2NaOH+CO2 \text{ and } 2H2O \rightarrow 2H2+O2$$

The hydrogen and/or nitrogen and/or ammonia or methanol may be produced by a direct air capture of carbon dioxide apparatus and process as described in U.S. Pat. No. 12,151,206, issued on Nov. 26, 2024 to Carbon Utility LLC; the entirety of which is hereby incorporated by reference herein.

Figure 3:
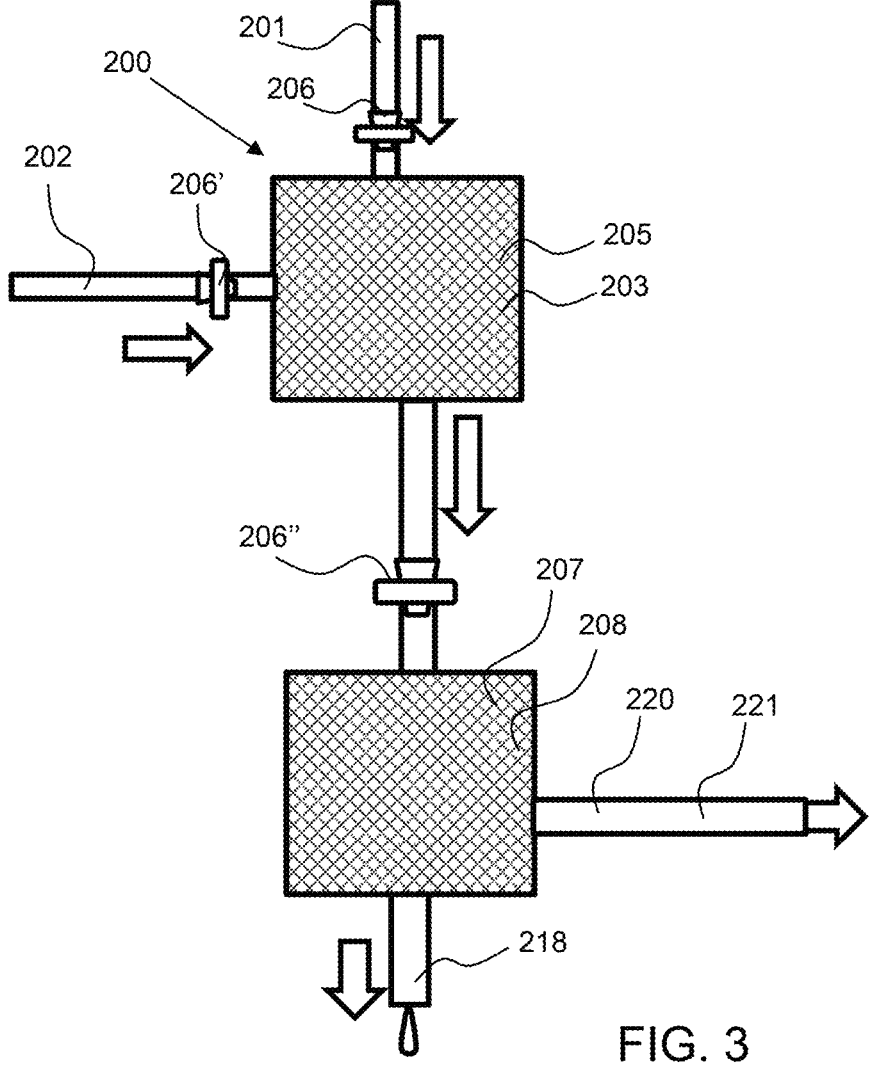
FIG. 3 is a block diagram that illustrates the second step, where CO2 and hydrogen are used to synthesize methanol

FIG. 3 shows a block diagram of a methanol synthesis system 200, that has teal hydrogen and carbon dioxide inputs and produces methanol. The teal hydrogen 201 and carbon dioxide 202 may be mixed in a 3:1 molar ratio by mass flow controllers 206, 206' to produce a methanol feed mixture 203. The methanol feed mixture may be temporarily stored in a storage tank 205 before being compressed and metered (by another mass flow controller) 206" into a reactor 207 that may be packed with a catalyst 208, such as copper/zinc oxide-based catalyst at and elevated pressure and temperature, such as about 80 bar and 260° C. or more. When hydrogen and CO2 contact the surface of the heated catalyst, methanol 220 and water 218) are formed. The methanol synthesis system 200 may be a green methanol synthesis system that does not produce any waste carbon dioxide and may use only carbon-free power source such as a renewable power source as defined herein. Therefore, the methanol produced may be green methanol 221. This methanol synthesis reaction is: $3H_2+CO_2 \rightarrow CH_3OH+H_2O$.

The maximum carbon dioxide-to-methanol conversion is about 24 percent. The unreacted CO2, hydrogen, methanol, and water exit the reactor through a back pressure regulator, which sets the reactor pressure. These products are then cooled and the "wet methanol" is separated from the unreacted CO2 and hydrogen, which are recirculated and recompressed so that up to 99% of carbon is converted to methanol.

Unlike ethanol, methanol does not form an azeotrope and the methanol and water may be separated by simple distillation.

Figure 4:
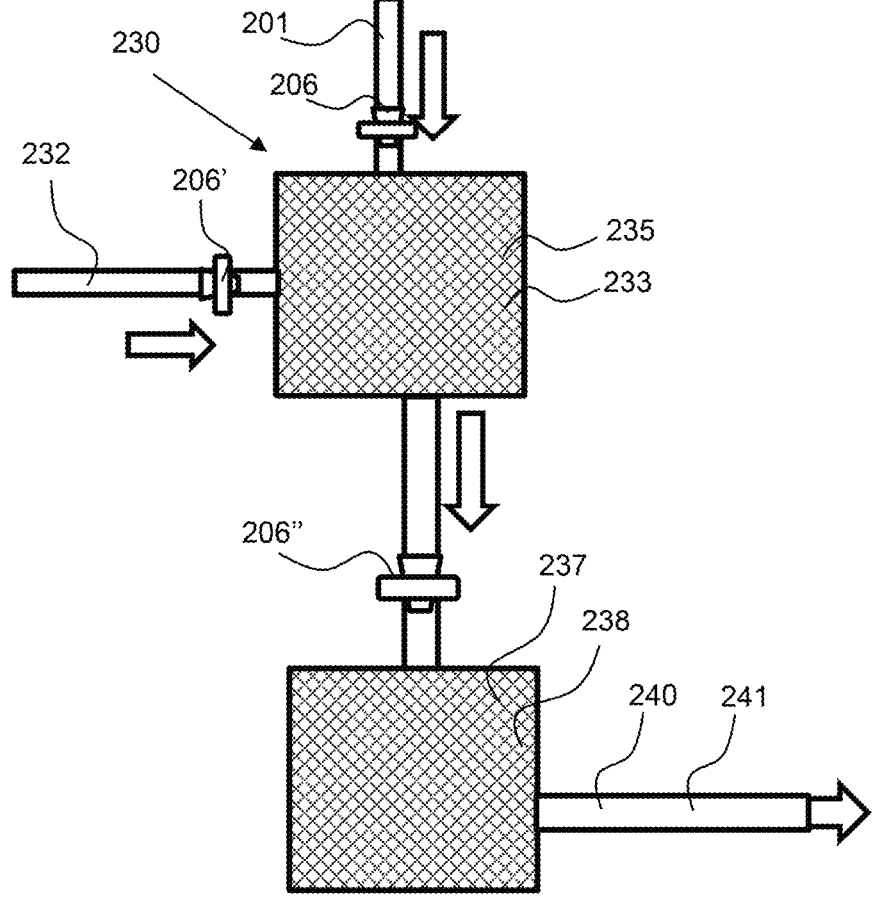
FIG. 4 is a block diagram that illustrates the third step, where hydrogen and nitrogen are used to synthesize ammonia.

FIG. 4 shows a block diagram of an ammonia synthesis system 230 that is nearly identical in concept and implementation as methanol synthesis system 200 shown and described for FIG. 3, with the exception that methanol synthesis uses hydrogen and carbon dioxide in ratio of about 3:1, while ammonia synthesis uses hydrogen and nitrogen in a 3:1 ratio. Both reactions have a low conversion of about 20% and both require recycling of unreacted gases. Using the newest catalysts (such as KATALCO 74-1 Green) carbon-free Ammonia may be synthesized at about 300° C. and as low as 30 bar, whereas methanol is formed at about 260° C. and 100 bar.

As shown in FIG. 4, the ammonia synthesis system 230, has teal hydrogen 201 and nitrogen inputs and produces ammonia. The teal hydrogen 201 and nitrogen 232 may be mixed in a 3:1 molar ratio by a mass flow controllers 206, 206' to produce an ammonia feed mixture 233. The ammonia feed mixture may be temporarily stored in a storage tank 235 before being compressed and metered by another mass flow controller 206" into a reactor 237 packed with a catalyst 238, at and elevated pressure and temperature. When hydrogen and nitrogen contact the surface of the heated catalyst, ammonia 240 are formed. The ammonia synthesis system 230 may be a green ammonia synthesis system that does not produce any waste carbon dioxide and may use only renewable power supply as defined herein. Therefore, the ammonia produced may be green ammonia 241. The nitrogen used in the ammonia synthesis system may be green nitrogen such as nitrogen captured from the atmosphere using carbon-free energy sources.

The governing chemical equations for the ammonia synthesis system is $$3H2+N2 \rightarrow 2NH3$$

Figure 5:
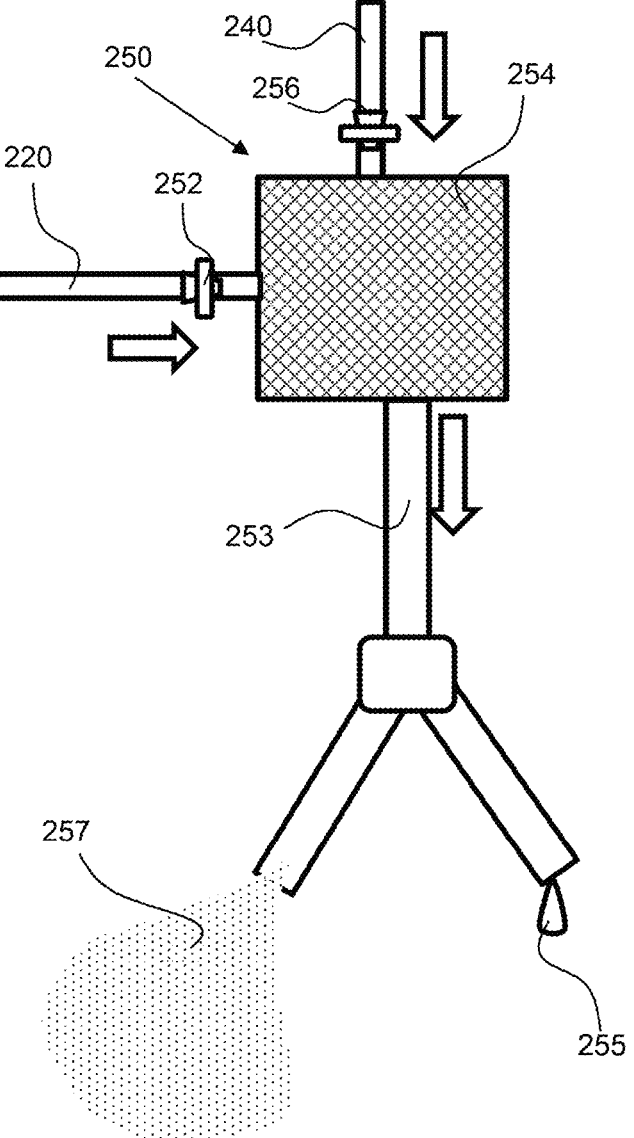
FIG. 5 is a block diagram that illustrates the fourth step, where methanol and ammonia are used to synthesize acetonitrile.

FIG. 5 depicts a block diagram of an acetonitrile synthesis process 250 that produces precursor acetonitrile 255 from methanol 220 and ammonia 240, preferably from the green methanol 221 and green ammonia 241 as described and shown in FIGS. 4 and 5, respectively. At high temperatures methanol breaks down to carbon monoxide and hydrogen:

$$CH3OH \rightarrow CO+2H2$$

And the theoretical reaction equation is:

$$2CO+2H2+NH3 \rightarrow C2H3N+2H2O$$

The selectivity to acetonitrile is relatively low at about 50% and the reaction results in several undesired byproducts, principally CO2, CH4, and unreacted CO. To minimize these byproducts, a methanol mass flow controller 252 and ammonia mass flow controller 256 are adjusted to feed reactants into an acetonitrile 254 to output a CO:H2:NH3 molar ratio of about 1:2:1. This feed ratio is fed into a fixed bed reactor operating at about 500 C and 2-7 bar containing a molybdenum/silica catalyst. Reactor space velocity is set by the mass flow controllers, which adjust feed rate. The reactor output (effluent) 253 is cooled and the liquids, consisting primarily of precursor acetonitrile 255 (wet acetonitrile) is separated from the gaseous byproducts 257, which may be flared or, preferentially, recovered, separated, and recycled.

Finally, the acetonitrile is separated from the water by distillation techniques known to those skilled in the art.

Figure 6:
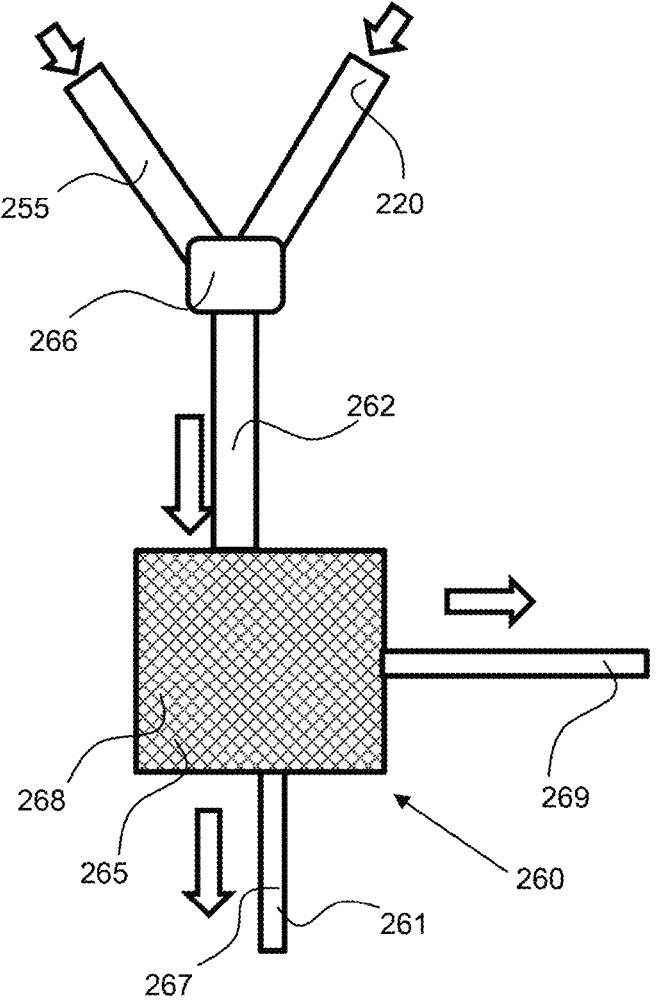
FIG. 6 is a block diagram that illustrates the fifth step, where acetonitrile and methanol are used to synthesize acrylonitrile.

FIG. 6 depicts a block diagram for acrylonitrile synthesis process 260 from precursor acetonitrile 255 and methanol 220, preferably green methanol. The basic (unbalanced) reaction equation is:

$$CH3CN + CH3OH \rightarrow C3H3N$$

This reaction suffers from a low yield of about 10%. However, the reaction is highly selective for acrylonitrile 261 at about 95% and about 4% propionitrile 267, with less than 1% of byproduct gases 269, which may include CO2, CH4, H2, and unreacted CO. The low yield and high selectivity results in large amounts of the original reactants, acetonitrile and methanol being present in the reactor effluent, which may be recovered and recycled.

FIG. 6 shows the reactants 262 that are about 10% precursor acetonitrile 255 in methanol 220 that is pumped into a fixed bed reactor 265 through a mass flow controller 266, which sets the space velocity. The reactor temperature is controlled to about 350° C. by a controller and means of heating and/or cooling (not shown). Pressure is adjusted, such as to about 0.5 bar by a back pressure regulator. The reactor may contain a catalyst 268, such as a chromium-magnesium oxide catalyst to facilitate the desired reaction.

The reactor effluent is cooled and the liquids, which account for about 99% of the output, is separated from the gaseous byproducts, which are primarily CH4, CO, CO2, and H2, by a liquid/gas separator. The gases may be flared, while the liquids, consisting of unreacted methanol and acetonitrile and reaction products acrylonitrile and propionitrile, proceed through a series of distillation columns to effect separation of the products and recycling (not shown) of the unreacted acetonitrile and methanol.

Not shown is the sixth step, where acrylonitrile is polymerized to polyacrylonitrile (C2H3N)n. The polymerization reaction is C2H3N→(C2H3N)n. This reaction is facilitated by using an initiating system consisting of hydrogen peroxide (H2O2) and Ferric Chloride (FeCl3).

The remaining steps to convert polyacrylonitrile into carbon fibers are primarily electro-mechanical and thermal in nature and performed by commercially available devices know to those skilled in the art. These remaining steps may include electrospinning of polyacrylonitrile into acrylic fibers by a commercially available electrospinning machine, and the conversion of acrylic fibers to carbon fibers by means of stabilization and carbonization using an atmospherically controlled, programmable furnace.

Figure 7:
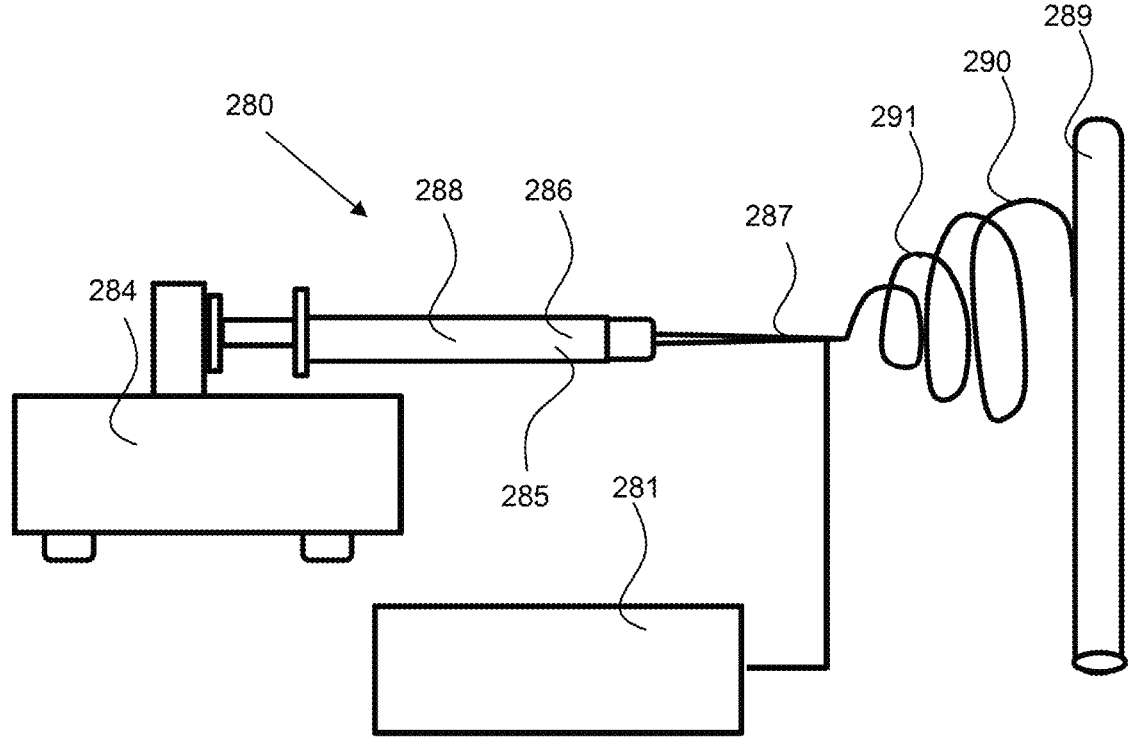
FIG. 7 shows a diagram of an electrospinning apparatus and process to produce acrylic fibers from the polyacrylonitrile.

FIG. 7 shows a diagram of an electrospinning process 280 that may be utilized to produce acrylic fibers 291 from the polyacrylonitrile 285 from any of the process described herein, including those shown and described in FIGS. 4 to 6. Polyacrylonitrile 285 is preferably green polyacrylonitrile, as defined herein. The electrospinning process may include a pump 284, such as a syringe pump, having a syringe or reservoir 288 that contains a polymer solution 286, and a high voltage power supply 281 that charges an electrically conductive needle 287 coupled to the pump 284 to produce electrospun polyacrylonitrile fibers 290 as they flow with charge to a metal collector 289.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A process for producing a carbon product through a carbon negative process comprising:
   a) producing carbon dioxide from the atmosphere comprising:
      i) providing an air capture carbon dioxide process that includes a cyclic process that utilizes a liquid hydroxide solution as a solvent to capture the carbon dioxide, which forms a carbonate solution;
      ii) one or more transportable containers and wherein the air capture carbon dioxide process is configured in the one or more transportable containers;
   b) providing a three-compartment electrolytic cell and reacting the carbonate solution in the three-compartment electrolytic cell to produce the carbon dioxide, produce hydrogen, and produce oxygen;
      wherein the three-compartment electrolytic cell is configured in a three-compartment electrolytic cell transportable container; and
      wherein producing the carbon dioxide and producing hydrogen is portable;
   c) producing methanol from said carbon dioxide and said hydrogen;
   d) producing nitrogen from the atmosphere;
   e) producing ammonia from said nitrogen and said hydrogen;
   f) combining the methanol and the ammonia to form acetonitrile ($C_2H_3N$);
   g) synthesize acrylonitrile ($C_3H_3N$) from acetonitrile and said methanol;
   h) polymerizing acrylonitrile to polyacrylonitrile ($C_2H_3N$) n, and
   i) carbonizing the polyacrylonitrile into a carbon product; and
      wherein the end product permanently sequesters carbon dioxide from the environment; and
      wherein the producing carbon dioxide from the atmosphere is a green carbon dioxide process utilizing air from the atmosphere.

2. The process of claim 1, further comprising electrospinning the polyacrylonitrile into acrylic fibers and then carbonizing the acrylic fibers into the carbon product that consists of a carbon fiber.

3. The process of claim 2, wherein the carbon fibers are carbon micro-fibers having a diameter of 10 μm or less.

4. The process of claim 1, wherein the green carbon dioxide process utilizes only renewable power sources.

5. The process of claim 4, wherein the air capture carbon dioxide process comprises:
   a hydroxide-based carbon dioxide capture system comprising:
      a hydroxide container that is a first transportable container of said one or more transportable containers having an inlet and an outlet;
      a hydroxide packing material that is permeable and is located within the hydroxide container;
      a hydroxide compound;

a hydroxide solution spray nozzle that sprays a hydroxide solution containing said hydroxide compound onto the hydroxide packing material;

a first air moving device that produces a first flow of ambient air through said hydroxide container and through said hydroxide packing material and over said hydroxide compound to extract carbon dioxide from said first flow of ambient air and produce a carbonate compound;

a carbonate tank located under the hydroxide packing material to receive the carbonate compound by gravity, wherein the carbonate compound flows off the hydroxide packing material and into the carbonate tank;

a de-misting device located within the hydroxide container to reduce the hydroxide in the airflow from exiting the hydroxide container.

6. The process of claim 5, wherein the air capture carbon dioxide process further comprises:

a carbonate-based carbon dioxide capture system comprising:

a carbonate container that is a second transportable container of said one or more transportable containers having an inlet and an outlet;

a carbonate packing material that is permeable and is located within the carbonate container;

a carbonate solution spray nozzle that sprays a carbonate solution containing said carbonate compound onto the carbonate packing material;

a second air moving device configured to direct a second flow of ambient air through said carbonate container through said carbonate packing material and over said carbonate compound from said hydroxide-based carbon dioxide capture system to produce a bicarbonate compound and extract carbon dioxide from the second flow of air;

a bicarbonate tank located under the carbonate packing material to receive the bicarbonate compound by gravity, wherein the bicarbonate compound flows off the carbonate packing material and into the bicarbonate tank;

a de-misting device located within the carbonate container to reduce the hydroxide in the airflow from exiting the hydroxide container.

7. The process of claim 1, wherein the liquid hydroxide is a metal salt comprising at least one of potassium hydroxide or sodium hydroxide.

8. The process of claim 6, wherein the reaction of the carbonate solution in the three-compartment electrolytic cell forms the carbon dioxide, the hydrogen, oxygen and the hydroxide.

9. The process of claim 8, wherein the air capture carbon dioxide process is a green carbon dioxide process that produces the green carbon dioxide, the green hydrogen, the green oxygen and the green hydroxide utilizing a carbon-free power source.

10. The process of claim 9, wherein the hydroxide is recycled in the cyclic process for use to capture more $CO_2$ from air.

11. The process of claim 1, wherein synthesizing acrylonitrile (C3H3N) from acetonitrile and methanol includes the reaction C2H3N+CH3OH→C3H3N.

12. The process of claim 11, wherein producing methanol is produced from carbon dioxide and hydrogen utilizing a methanol reaction of $CO2+3H2 \rightarrow CH_3OH+H_2O$.

13. The process of claim 12, wherein producing the methanol is a green methanol process that produces the green methanol utilizing a carbon-free power source.

14. The process of claim 13, wherein the producing nitrogen from the atmosphere is a green nitrogen process that produces a green nitrogen and utilizes pressure swing absorption.

15. The process of claim 14, wherein the producing ammonia from hydrogen and the nitrogen includes a reaction for producing ammonia of $3H_2+N_2 \rightarrow 2NH_3$.

16. The process of claim 14, wherein producing ammonia from the hydrogen and the nitrogen is a green ammonia process that utilizes a carbon-free power source.

17. The process of claim 14, wherein combining the methanol and the ammonia to form acetonitrile includes a precursor acetonitrile reaction of $2CH_3OH+NH_3 \rightarrow C_2H_3N+ 2H_2O+2H_2$ to form said precursor acetonitrile ($C_2H_3N$).

18. The process of claim 17, wherein the reaction for polymerizing acrylonitrile to polyacrylonitrile includes a polymerizing acrylonitrile reaction of $(C_2H_3N)_n$ includes $C_2H_3N \rightarrow (C_2H_3N)_n$.

19. The process of claim 18, wherein the polymerizing acrylonitrile reaction includes an initiator comprising hydrogen peroxide ($H_2O_2$) and Ferric Chloride ($FeCl_3$).

20. The process of claim 18, wherein producing nitrogen from the atmosphere is a green nitrogen process that produces the green nitrogen and utilizes pressure swing absorption.

21. The process of claim 1, wherein the one or more transportable containers for the air capture carbon dioxide process is an International Organization for Standards (ISO) metal container, and wherein the transportable container for the three-compartment electrolytic cell is an International Organization for Standards (ISO) metal container.

\* \* \* \* \*